Sept. 11, 1956    R. GOUIRAND    2,762,633
PNEUMATIC SUSPENSION FOR VEHICLES
Filed June 14, 1952    2 Sheets-Sheet 2

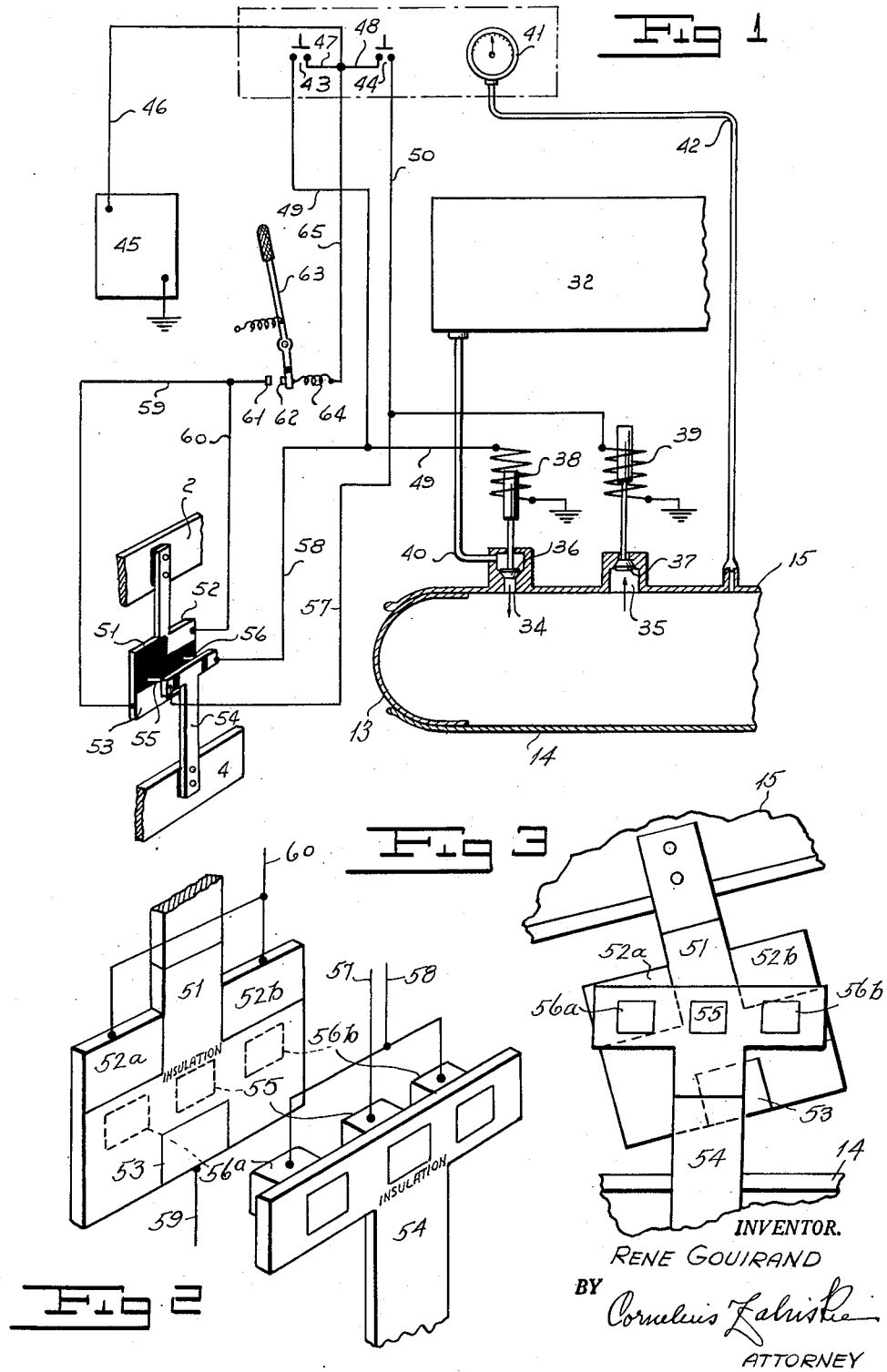

INVENTOR
RENE GOUIRAND
BY
ATTORNEY

United States Patent Office 2,762,633
Patented Sept. 11, 1956

2,762,633

PNEUMATIC SUSPENSION FOR VEHICLES

Rene Gouirand, New York, N. Y.

Application June 14, 1952, Serial No. 293,695

8 Claims. (Cl. 280—124)

This invention relates to the pneumatic suspension of motor vehicles, the present application being a continuation-in-part of my copending parent application, Serial No. 678,605, filed June 22, 1946 (now Patent No. 2,624,594, issued January 6, 1953).

Said parent application is directed primarily to a novel pneumatic cushion and novel structural arrangements and mechanisms associated therewith to support a vehicle body above an axle. In operating a vehicle having such a pneumatic suspension, some means must be provided for supplying air to a cushion as and when necessary or desirable.

The present invention embodies a novel system whereby compressed air may be automatically supplied to or released from the cushion according to the requirements of the load imposed upon the body, and whereby the operator may manually control the supply of air to or its exit from the cushion, so as to provide for maximum efficiency under all conditions of road and load.

Features of the invention, other than those adverted to, will be apparent from the hereinafter detailed description and appended claims, when read in conjunction with the accompanying drawing.

The accompanying drawing illustrates different practical embodiments of the invention but the constructions therein shown are to be understood as illustrative, only, and not as defining the limits of the invention.

Figure 1 is a diagrammatic view showing a control means for increasing or decreasing air pressure in a pneumatic cushion either manually or automatically according to this invention.

Figure 2 is a fragmental perspective detail showing a modified form of current switching device.

Figure 3 is a facial view of the modification shown in Figure 2 graphically illustrating its purpose, as distinguished from the switching device shown in Figure 1.

Figure 4:
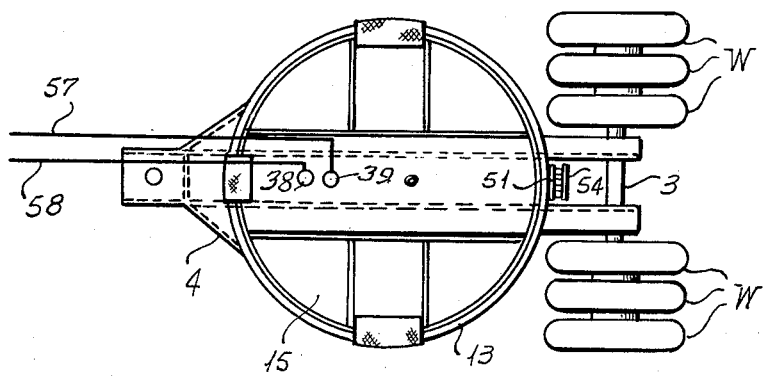
Figure 4 is a plan view of my pneumatic suspension removed from the chassis frame and body.
Figure 5:
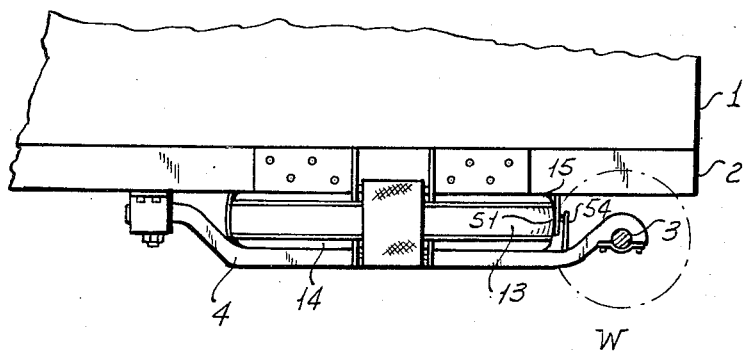
Figure 5 is a side elevation of the structure shown in Fig. 4 with the near wheels broken away.

The present invention may be associated with or form part of any pneumatic vehicle suspension, but, for the purpose of illustration, it will herein be considered as used to control the admission or release of air from the pneumatic cushion 13 of the parent patent. According to the parent case, the pneumatic cushion 13 is interposed between an upper bearer 15 and a lower bearer 14 (see Figs. 4 and 5). The lower bearer 14 is mounted on a cradle 4 secured to the chassis frame 2 of the body 1 of the vehicle, so that the interposed pneumatic cushion serves to support the body and its load above the axle 3 having wheels W. The disclosure of the parent patent is to be understood and considered as included in and forming a part of the disclosure of the present application, wherefore it is not considered necessary to include in the drawing and description of this application, all of that which is explained in the parent case.

In Fig. 1 of the drawings 32 indicates a compressed air tank. This tank may, if desired, be attached to or be a part of the upper bearer 15 (as, e. g., built into or superimposed on said bearer) or it may be the usual compressed air tank, conventional with most vehicles employing compressed air brakes, more particularly trucks, although, if desired, a special tank may be provided on the vehicle for use in conjunction with this invention and appropriate means may also be provided for maintaining a desired amount of compressed air in storage at the desired compression in this tank.

The pneumatic cushion has a compressed air inlet 34 and a relief outlet 35. Both the inlet and outlet have valves 36 and 37, respectively, and to the stems of each of these valves is connected the coil of a magnet, e. g., a solenoid. The coil of the solenoid which controls the inlet valve 36 may be referred to as the inlet valve solenoid coil 38, while the coil 39, which controls the outlet valve, may be referred to as the solenoid coil of the outlet valve. When these coils are energized, they operate to open the valves to admit or relieve pressure, as the case may be, for the inlet valve chamber is connected by a tube 40 to the compressed air tank 32, while the chamber of the outlet valve vents to the atmosphere when this valve is opened.

Preferably on the dashboard of the vehicle is a gauge 41 connected by a tube 42 with the interior of the cushion 13, so that the operator of a vehicle may at any time observe the amount of pressure in the cushion.

Also mounted on the dashboard of the vehicle are two switches 43 and 44 which may conveniently be pushbutton switches. The battery of the vehicle is shown at 45. One pole of the battery is grounded, while the other pole is connected by a feed wire 46 to one terminal of each of the switches 43 and 44 by branch wires 47 and 48. From the other pole of the switch 43, wire 49 leads to one terminal of the inlet valve solenoid coil 38, while the other terminal of that coil is grounded. From the pushbutton switch 44 wire 50 leads to one terminal of the outlet valve solenoid coil 39, the other terminal of which is also grounded. By operating either of the pushbutton switches 43 or 44, an operator may, at will, admit air into the cushion 13 or permit relief of pressure therefrom, as may be desired, and at the same time can observe by the gauge 41 the pressure in such cushion.

In addition to this manual control the present invention also provides a purely automatic control in accordance with the loading of the vehicle body. Different forms of automatic current switching means may be used to control the valves 36 and 37. One form is shown in Fig. 1. Here there is mounted on some convenient portion of the chassis frame 2 a depending plate 51 which is insulated from the frame. This plate has "live" portions or contacts 52 and 53, shown as white in Fig. 1 of the drawing, and an insulated portion shown in black. Mounted on the cradle 4 or on the lower bearer 14 is an upstanding plate 54 shown as of T-shape and the lateral projecting arms of the T carry contacts 55 and 56 which are insulated from one another.

The contact 55 is connected by a wire 57 to the wire 50 which leads to the solenoid of the outlet valve 37, while the contact 56 is connected by a wire 58 to the wire 49 which leads to the solenoid of the inlet valve 36. The "live" portions or contacts 52 and 53 of the upper plate 51 are connected by wires 59 and 60 to one contact of a switch 61, the other contact 62 of which is carried by, but insulated from, the emergency brake lever 63 of the vehicle and this latter contact 62 is connected through a pigtail 64 and wire 65 to the main feed wire 46. The parts are so adjusted that, when the vehicle is empty (i. e., unloaded), the contacts 55 and 56 will be on the insulated portion of the plate 51 and there will be an optimum pressure in the cushion 13 to properly support the body of the vehicle and give good riding conditions.

If the vehicle is a truck and that truck is empty, the parts will appear as in Fig. 1. When the truck stops to receive a load, it is the universal practice among truck drivers to set the emergency brake to the vehicle, i. e., to actuate the brake lever 63 for the purpose of setting these brakes. This operation automatically engages the contact 62 with contact 61 and closes the circuit from the battery through wires 46, 65, 59 and 60, so that the contacts 52 and 53 are "live." However, since the truck is empty, the contacts 55 and 56 are engaged with the insulated portion of the plate 51 and the normal pressure for the unloaded truck is present within the cushion 13.

Suppose, however, that there is now loaded upon the truck a load in excess of that which the pressure in the cushion 13 can properly support. This load will force the chassis frame downwardly and thus decrease the distance between the parts 2 and 4, shown in Fig. 1, (and also 14 and 15 of the same figure), so that the contact 56 will move into engagement with the "live" contact 52. As soon as this occurs, current will be fed from this "live" contact 52, through the contact 56, to the solenoid coil 38 and sufficient pressure will be admitted into the cushion to restore equilibrium. This will be done entirely automatically and in accordance with the load which is placed on the truck. When sufficient pressure has been admitted, the chassis frame will be lifted by the pressure in the cushion, so as to again deenergize the solenoid coil 38 and restore the parts to the position shown in Fig. 1.

Now suppose that the truck, having traveled to its destination, is unloaded. As the load is removed, the pressure in the cushion 13 will become more than required and consequently the distance between the parts 2 and 4 (and also between the parts 14 and 15) of Fig. 1 will be increased, causing the contact 55 to engage with the "live" contact 53, and, since the emergency brake 63 has been set during unloading, current will be fed to the solenoid coil 39, and the pressure within the cushion 13 will be relieved until a state of equilibrium is again restored. In this way the feed or discharge of pressure to the cushion is obtained in an entirely automatic manner and in a way to maintain equilibrium and optimum conditions for all loadings.

The system which I have thus far described in Fig. 1 operates very satisfactorily under practically all conditions. However, it does not provide for uneven loadings which may occur if the persons effecting such loadings are careless. For instance, if a heavy weight is so placed on a truck that it is all of one side of the center line of the body, the body will tilt and tend to impose a greater pressure on one lateral half of the cushion than on the other lateral half thereof. The arrangement of Fig. 1 will of course feed in sufficient air to carry the load in this off-balanced or untrimmed condition, but in so doing, it may feed in more pressure than would be necessary to carry the load.

The control switch mechanism of Figs. 2 and 3 safeguards uneven loading so as to permit optimum pressures under all conditions. Referring to these latter views, 51 designates a depending plate which corresponds to the similar plate of Fig. 1. This may be secured either to the chassis frame, as in Fig. 1, or to the upper bearer 15 or some relatively rigid part, as shown in Fig. 3. The upstanding plate 54 corresponds to the like plate of Fig. 1 and may be secured to the cradle or to the lower bearer 14 or to the axle or the like. These two plates 51 and 54 are relatively movable in a vertical direction in accordance with the loading and pursuant to this embodiment of the invention should be mounted medially of the width of the body of the vehicle and extend transversely of the body either before or aft of the bearers 14 and 15. In other words, these plates 51 and 54 should be placed at substantially the transverse center of the body, so that the tilting of the body will effect a corresponding lateral tilting of the upper plate 51 after the manner shown in greatly exaggerated form in Fig. 3, where the upper bearer is shown as tilted sharply to the left. In actual practice, the tilt would never be as pronounced as here illustrated, but this will illustrate the mode of operation of the parts, it being understood that the tilting of the upper bearer and consequent tilt of the body might be in either lateral direction.

In contradistinction to the single contact 52 connected to live wire 60 in Fig. 1, the plate 51 of Figs. 2 and 3 has two live contacts 52a and 52b which are connected in multiple to the live wire 60 as shown. These two contacts 52a and 52b are arranged at the same elevation and are spaced laterally apart as shown on opposite sides of the medial line of the vehicle body. The contact 53, shown at one side in Fig. 1, is shown centrally located in Figs. 2 and 3. All of the plate 51, except the contacts 52a, and 52b and 53 is of insulation. The lower plate 54 may be made entirely of insulation and carries dual contacts 56a and 56b connected in multiple to the wire 58 and corresponding to the single contact 56 of Fig. 1. The contact 55 of Fig. 2 is a single contact, as in Fig. 1, but it is arranged centrally in Fig. 2. It is connected by a wire 57 to the solenoid of the outlet valve 37.

With the structure of Figs. 2 and 3 substituted for the corresponding switch mechanism in Fig. 1, it will be noted that the two structures will operate in the same way under ordinary conditions. However, if the body is loaded unevenly, as indicated in Fig. 3, one of the contacts 56a or 56b will be engaged with the conductive portions 52a or 52b much quicker than would be the case with the switch mechanism of Fig. 1 and consequently the unequal loading would be more satisfactorily compensated for. In unloaded condition, the body will not ordinarily tilt, but even though it does, the central contacts 55 and 53 will serve to maintain the air pressure in the cushion from being too great for the unloaded condition of the body.

The foregoing detailed description sets forth the present invention in certain of its preferred practical forms, but the invention is to be understood as fully commensurate with the appended claims.

Having thus fully described the invention, what I claim as new and desire to secure by Letters Patent is:

1. In a vehicle wherein a body is supported above the wheeled axle by a pneumatic weight carrying cushion interposed between them and having compressed air inlet and exhaust valves, a magnet for opening each valve, a source of air under pressure communicating with the inlet valve to feed compressed air to the cushion when the inlet valve is opened, an electric switch embodying relatively movable elements one of which is movable with a body and another of which is movable with the axle, one of said elements having conducting contacts connected in an electric circuit with a source of electrical energy and through such source to ground and the other element having contacts connected in an electric circuit through the magnets to ground to admit air to the cushion when the load on the body is appreciably increased and to release air therefrom when said load is appreciably decreased, the circuits of both magnets including a brake controlled switch normally open but closed when the vehicle is at rest in braked condition.

2. A vehicle comprising a body, a wheeled axle beneath the body, braking means including a manually operable lever for braking said wheels, a pneumatic weight carrying cushion interposed between the axle and the body and provided with air inlet and outlet valves, a source of air under pressure communicating with the inlet valve to feed compressed air into the cushion when said inlet valve is opened, an electric switch embodying two relatively movable elements, one of which is movable with the body and the other of which is movable with the axle, one of said elements having conductive contacts movable over electrically conductive and non-conductive surfaces on the other element and said conductive contacts being respectively connected to electrical means for selectively operating the inlet and outlet valves of the cushion, the conductive surfaces of the other element being electrically connected to a source of electrical energy through a switch operable by the brake lever, said conductive contacts and said electrical conductive surfaces being positioned to admit air to the cushion through the inlet valve when the cushion is unduly compressed and to release air from said cushion through the outlet valve when the cushion is unduly expanded.

3. A vehicle according to claim 2, in which there is included manually operable means for actuating the inlet and outlet valves at the will of the operator.

4. A vehicle wherein a body is supported above a wheeled axle by a horizontally disposed pneumatic weight carrying cushion interposed between them and centrally disposed transversely of the vehicle, said cushion having compressed air inlet and exhaust valves with a magnet for operating each of them, an electric switch located substantially midway of the width of the body and embodying two relatively movable elements one of which is movable with the body and the other of which is movable with the axle, one of said elements having horizontally transversely spaced apart electrical contacts arranged at the same elevation and electrically connected in multiple to a source of electrical energy, and a third contact arranged at a different vertical elevation and also connected with said source of electrical energy, the other element having transversely spaced apart contacts arranged at the same elevation and connected together in multiple to an electric circuit including the magnet of the inlet valve, and an intermediate contact connected to the magnet of the exhaust valve.

5. In a vehicle wherein a body is supported above the wheeled axle by a horizontally disposed pneumatic weight carrying cushion interposed between them and centrally disposed transversely of the vehicle, said cushion having compressed air inlet and exhaust valves with a magnet for operating the inlet valve, a circuit including said magnet, a source of electrical energy and a switch, said switch being arranged substantially midway of the width of the vehicle and interposed between the body and the axle and including pairs of current switching contacts connected in multiple at opposite sides of the medial line of the vehicle, each pair of contacts including one contact movable with the body and the other contact movable with the axle, with the axle contacts and the body contacts spaced equal distances apart when the vehicle is at rest on level ground with the body transversely level, and means for operating the exhaust valve.

6. A vehicle as claimed in claim 5, wherein the means for operating the exhaust valve comprises a magnet connected to said exhaust valve and a circuit including the source of electrical energy, and a pair of current switching contacts respectively movable with the body and axle and positioned to engage one another when the spacing between the axle and the body exceeds the predetermined maximum.

7. A vehicle wherein a body is supported above a wheeled axle by a horizontally disposed pneumatic weight carrying cushion interposed between them, said cushion having compressed air inlet and exhaust valves with a magnet for operating each of them, an electric switch located substantially midway of the width of the body and embodying two relatively movable elements one of which is movable with the body and the other of which is movable with the axle, one of said elements having horizontally transversely spaced apart electrical contacts arranged at the same elevation and electrically connected in multiple to a source of electrical energy, and a third contact arranged at a different vertical elevation and also connected with said source of electrical energy, the other element having transversely spaced apart contacts arranged at the same elevation and connected together in multiple to an electric circuit including the magnet of the inlet valve, and a third contact connected to the magnet of the exhaust valve.

8. In a vehicle wherein a body is supported above a wheeled axle by a pneumatic weight carrying cushion interposed between them and having compressed air inlet and exhaust valves with a magnet for operating each of them, inlet and exhaust switches connected across the space between the body and axle, the inlet switch being closed when the space reaches a predetermined minimum and the exhaust switch being closed when the space reaches a predetermined maximum, electric circuits connecting the inlet switch with the magnet of the inlet valve and the exhaust switch with the magnet of the exhaust valve, and a brake controlled normally open switch included in said circuits and closed only when the brake is in position to brake the vehicle.

References Cited in the file of this patent
UNITED STATES PATENTS

| | | |
|---|---|---|
| 1,641,640 | Meyers | Sept. 6, 1927 |
| 2,191,211 | Krotz | Feb. 20, 1940 |
| 2,361,575 | Thompson | Oct. 31, 1944 |
| 2,506,726 | Magrum | May 9, 1950 |
| 2,684,254 | Goss | July 20, 1954 |